United States Patent
Pevny

(10) Patent No.: US 9,973,520 B2
(45) Date of Patent: May 15, 2018

(54) EXPLAINING CAUSES OF NETWORK ANOMALIES

(71) Applicant: Cisco Technology, Inc., San Jose, CA (US)

(72) Inventor: Tomas Pevny, Modrany (CZ)

(73) Assignee: Cisco Technology, Inc., San Jose, CA (US)

( * ) Notice: Subject to any disclaimer, the term of this patent is extended or adjusted under 35 U.S.C. 154(b) by 122 days.

(21) Appl. No.: 14/331,486

(22) Filed: Jul. 15, 2014

(65) Prior Publication Data

US 2016/0021122 A1 Jan. 21, 2016

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |

(52) U.S. Cl.
CPC ................................ *H04L 63/1425* (2013.01)

(58) Field of Classification Search
CPC ... G06F 21/577; G06F 21/55; H04L 63/1408; H04L 63/1416; H04L 63/1425; H04L 63/1441
See application file for complete search history.

(56) References Cited

U.S. PATENT DOCUMENTS

| | | | |
|---|---|---|---|
| 7,490,073 B1 | 2/2009 | Qureshi | |
| 8,161,552 B1 | 4/2012 | Sun et al. | |
| 8,352,409 B1 | 1/2013 | Satish | |
| 8,528,086 B1 * | 9/2013 | Aziz | H04L 63/1425 726/23 |
| 2003/0110392 A1 | 6/2003 | Aucsmith et al. | |
| 2004/0221178 A1 * | 11/2004 | Aaron | H04L 63/0227 726/23 |

(Continued)

OTHER PUBLICATIONS

International Searching Authority, "Search Report" in application No. PCT/US15/38671, dated Oct. 5, 2015, 17 pages.

(Continued)

*Primary Examiner* — Catherine B Thiaw
*Assistant Examiner* — Quy C Pham
(74) *Attorney, Agent, or Firm* — Hickman Palermo Becker Bingham LLP

(57) ABSTRACT

In an embodiment, the method comprises receiving network performance data for a computer network; receiving, from an intrusion detection system, network anomaly data indicating a plurality of anomalies that have occurred in the computer network; based, at least in part, on the network performance data and the network anomaly data, generating feature data; for each anomaly of the plurality of anomalies, using the feature data to determine a minimal set of features that distinguishes the anomaly from non-anomalies in the plurality of anomalies, and creating a mapping of the anomaly to the minimal set of features; based at least in part on the mapping, generating explanation rules for the plurality of anomalies; for a particular anomaly, identifying a particular rule of the explanation rules that is associated with the particular anomaly, and generating explanation data for the particular anomaly based upon the particular rule.

20 Claims, 6 Drawing Sheets

(56) References Cited

U.S. PATENT DOCUMENTS

| | | |
|---|---|---|
| 2008/0262990 A1* | 10/2008 | Kapoor ................... G06F 9/505 706/20 |
| 2010/0071061 A1* | 3/2010 | Crovella ............. H04L 63/1425 726/23 |
| 2011/0185422 A1* | 7/2011 | Khayam ............. H04L 63/1425 726/23 |
| 2012/0096549 A1 | 4/2012 | Amini |
| 2013/0198119 A1 | 8/2013 | Eberhardt |
| 2015/0135318 A1* | 5/2015 | Chi Tin ................. G06F 21/554 726/23 |
| 2016/0036844 A1 | 2/2016 | Kopp et al. |
| 2016/0275289 A1 | 9/2016 | Sethumadhavan |

OTHER PUBLICATIONS

Claims in application No. PCT/US15/38671 dated Oct. 2015, 5 pages.

* cited by examiner

EXPLAINING CAUSES OF NETWORK ANOMALIES

FIELD OF THE DISCLOSURE

The disclosure generally relates to computer network security techniques. The disclosure relates more specifically to techniques for generating explanations of anomalies occurring in the network.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Intrusion detection systems are usually configured to monitor network traffic and detect anomalies occurring in networks. An intrusion detection system may detect an anomaly in a network when the system determines that a pattern of the monitored traffic appears to be suspicious or matches a signature of a known attack on the network.

Network traffic patterns are usually described using lists of features, and each list may contain thousands of feature items. Because the difference between a suspicious pattern and a normal pattern usually amounts to a small difference in the feature lists, determining which features indeed indicate suspicious patterns may be difficult. Furthermore, in some situations, if the features are evaluated individually, they do not indicate any suspicious pattern; however, if the same features are evaluated in certain combinations, they may indicate suspicious patterns. Hence, determining whether a pattern is suspicious may involve testing not only the individual features, but also a multitude of the features' combinations.

Network intrusion detection systems are usually implemented using several processing layers, and output from one processing layer may serve as input to other processing layers. Every layer may include several anomaly detectors, and outputs from the detectors may be aggregated. Furthermore, individual detectors may use non-linear scales and grading functions. Therefore, outputs produced by the multi-layer intrusion detection systems are often complex and difficult to analyze.

DETAILED DESCRIPTION

Figure 1:
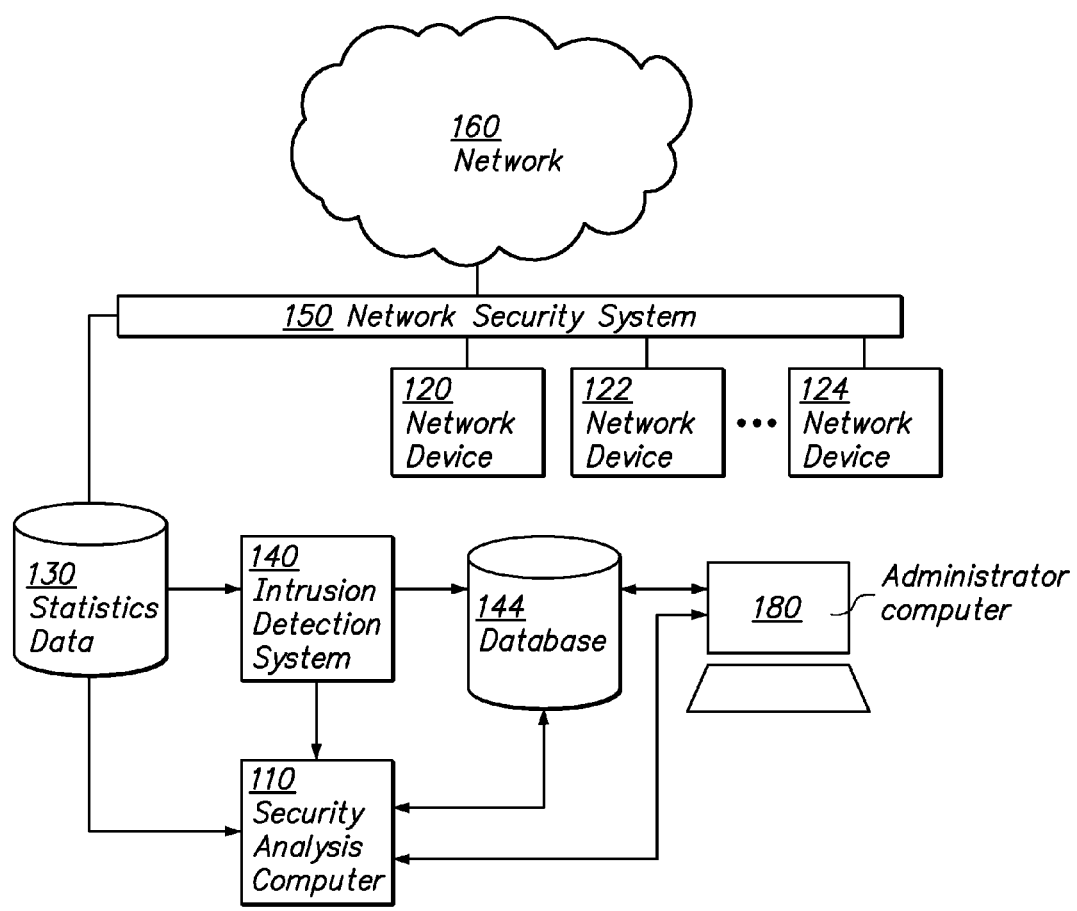
FIG. 1 illustrates an example of a network environment for generating explanations of network anomalies.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

This description follows the following outline:
1. Overview
2. Structural Overview
  2.1. Network Security System
  2.2. Intrusion Detection System
  2.3. Security Analysis Computer
  2.4. Administrator Computer
3. Collecting Network Performance Statistics Data
4. Network Performance Features
5. Anomalies
6. Normalization of Feature Values
7. Generating Mappings between Features and Anomalies
8. Rules
9. Process for Determining an Explanation of a Network Anomaly
10. Implementation Example—Hardware Overview

1. Overview

Embodiments provide techniques for determining explanations of causes of network anomalies. The explanations are generated based on indications of suspicious traffic and network performance data. Indications of the suspicious traffic may be provided by intrusion detection system(s) (IDS) or any other system configured to detect anomalies. Determining the causes is performed without knowing the algorithms and rules that the IDS employed to generate the indications of suspicious traffic.

In an embodiment, an IDS is treated as a black-box, and it is assumed that the algorithms and rules implemented by the IDS are unknown. Indeed, due to complexity of the algorithms, intricacy of the rules and multi-level processing employed by the IDS in detecting network anomalies, the IDS rarely provides explanations of the detected anomalies. The presented techniques allow determining the causes of the network anomalies without knowing the IDS' algorithms, rules and multi-level processing.

If a vendor of an IDS provides an explanation of detected anomalies, then the presented techniques may be used to determine whether the explanation provided by the vendor matches the explanation determined using the presented techniques. The matching may be performed by comparing the explanation provided by the vendor with the explanation determined using the presented techniques. The comparison may be used to determine whether the vendor indeed correctly explained the detected anomalies or whether the vendor's explanation is reasonable.

In an embodiment, a security analysis system comprises one or more processors and one or more non-transitory computer-readable storage media storing sequences of instructions which, when executed by the one or more processors, cause the processors to perform receiving network performance data and network anomaly data for a computer network. Network performance data may be received from a network security system. Alternatively, the network performance data may be received from a plurality of network security systems, or from other devices configured to monitor data traffic. Network anomaly data may be received from one or more IDS configured to monitor network traffic and detect anomalies occurring in the network.

Usually an IDS is not configured to provide explanations for the detected anomalies. For example, the IDS may provide indications of anomalies occurred in a computer network; however, the IDS rarely provides explanations of the causes of the detected anomalies. In fact, a typical IDS does not provide such explanations because the IDS usually employs multipart algorithms and multi-layer processing in detecting anomalies, and thus explaining the causes of the anomalies often is difficult.

Based, at least in part, on network performance data and network anomaly data, feature data is generated. Feature data represents features may be used to characterize anomalies. Examples of features may include a count of packets retransmitted in a network or a count of communications connections dropped in the network within a certain time period.

For each anomaly of a plurality of anomalies, a minimal set of features is determined. A minimal set of features may be determined using feature data. The minimal set of features distinguishes a particular type of anomaly from non-anomalies.

In an embodiment, a mapping of an anomaly to a minimal set of features is created. A mapping created for a particular anomaly represents an association between the particular anomaly and the minimal set of features that uniquely distinguishes the particular anomaly from the normal traffic (data).

In an embodiment, an individual mapping is created for each individual anomaly. Alternatively, a mapping may be created for a plurality of anomalies. Such a mapping may represent an aggregated mapping created by combining individual mappings (created for individual anomalies) into one mapping.

Based, at least in part, on a mapping, explanation rules for a plurality of anomalies are created. Explanation rules represent relationships between anomalies and features. For example, a particular explanation rule generated for a particular anomaly and for a particular minimal set of features may represent a relationship between the features in the particular set of features that needs to be satisfied for the particular anomaly to occur.

An explanation rule may be used to explain a cause of an anomaly by providing the relationship between the features in a particular set of features that is satisfied when the anomaly occurs in a network. For example, an explanation rule may explain the cause of a particular anomaly by providing that the particular anomaly occurs when a rate of retransmitted packets from a particular device exceeds a certain threshold value.

Once explanation rules are created for a plurality of anomalies, the rules are used to explain the anomalies. The process may be performed for each anomaly in a plurality of anomalies. For example, for a particular anomaly of the plurality of anomalies, the process may identify from the explanation rules a particular rule that is associated with the particular anomaly, and use the identified particular rule to explain the particular anomaly.

In an embodiment, based on a particular rule, explanation data for a particular anomaly is generated. The explanation data includes an explanation of the cause of the particular anomaly.

In an embodiment, in an explanation rule, a minimal set of features associated with an anomaly is identified. Based on contents of the minimal set of features, an explanation of the anomaly is generated, and provided to one or more users. For example, based on a particular rule and contents of a particular minimal set of features, the process may determine that a particular anomaly occurs when a feature, from the particular minimal set of features, indicating a count of retransmitted packets from a device, exceeds a certain threshold value.

In an embodiment, an indication that a new anomaly has occurred in the computer network is received from an IDS. Upon receiving the indication, the process determines whether the explanation rules contain a specific rule for the new anomaly. In response to determining that the explanation rules contain the specific rule for the new anomaly, a specific explanation of the new anomaly is generated using the specific rule.

However, in response to determining that the explanation rules do not contain the specific rule for the new anomaly, one or more new rules are generated. The new rules may be generated by performing: based, at least in part, on network performance data and the indication of the new anomaly, the feature data is updated. Using the updated feature data, a new minimal set of features that distinguishes the new anomaly from non-anomalies is created. A new mapping of the new anomaly to the new minimal set of features is created. Based at least in part on the new mapping, the specific rule for the new anomaly is generated. Using the specific rule for the new anomaly, a new explanation for the new anomaly is generated.

In an embodiment, one or more features, in the minimal set of features generated for a particular anomaly, are specific to a state of the computer network at approximately the same time at which the particular anomaly occurred or was detected.

In an embodiment, feature data specifies one or more of: information about packet retransmissions, information about active communications connections, information about transmissions of large files, information about email transmissions, information about traffic from a particular domain, information about traffic to a particular domain, a status of a packet retransmission rate, a status of an active connections count, a status of a large files transfer count, a status of an email volume size, a status of a traffic volume size, counts of undelivered communications, access failure information, device failure information.

In an embodiment, feature data is normalized based, at least in part, on default values of the features.

In an embodiment, an IDS is configured to not provide explanations for the anomalies.

In an embodiment, explanation rules are modified upon receiving new network performance data or indication of additional anomalies.

2. Structural Overview

FIG. 1 illustrates an example of a network environment for generating explanations of network anomalies. The depicted network environment comprises a security analysis computer 110, which receives network performance data from a statistics database 130. Network performance data may be collected by a network security system 150, such as a network security system, configured to manage security aspects of communications between network devices 120, 122, 124 and network 160.

Security analysis computer 110 may also receive network anomaly data from an IDS 140. Security analysis computer 110 may process the received network performance data and network anomaly data, generate features for the anomalies, and generate a mapping between the anomalies and the features. Furthermore, security analysis computer 110 may use the mapping to create explanations rules. Explanation rules may be used to generate explanations of the causes of the detected network anomalies. The explanation rules may be stored in a database 144 or other storage devices. The explanations may be retrieved from database 144 using a computing device, such as an administrator computer 180.

2.1. Network Security System

Network security system 150, depicted in FIG. 1, is configured to control or monitor network traffic exchanged between network devices 120, 122, 124 and network 160. Examples of network security system 150 may include a firewall. Network security system 150 may control the network traffic by applying a set of rules to the traffic information. By applying the set of rules, network security system 150 may establish a barrier between trusted network devices 120, 122, 124 and untrusted external network, such as network 160.

In an embodiment, network security system 150 is configured to intercept traffic between trusted network devices 120, 122, 124 and external network 160. Network security system 150 may also be configured to trace communications states established to facilitate communications between network devices 120, 122, 124 and external network 160. Furthermore, network security system 150 may be configured to provide network address translation functionalities and may serve as a proxy server.

In addition to performing a variety of security control functions, network security system 150 may also collect network performance data specific to network traffic exchanged between network devices 120, 122 and 124, and external network 160.

Network performance data may include information about communications connections established between devices, clients, users, sub-network, and the like. Network performance data may also include information specific to file transfers initiated by the devices/clients/users, exchanged emails, retransmitted files, network failures, device failures, and the like.

In an embodiment, network performance data refers to measures of service quality provided by devices in a network and the network as a whole. Service quality may be measured using different techniques, and the techniques may be customized to the network's nature and design.

Network performance may also be modelled instead of measured; one example of this is using state transition diagrams to model queuing performance in a circuit-switched network.

Examples of network performance data include bandwidth, throughput, latency, jitter, error rate, and the like. Bandwidth commonly is usually measured in bits/second and indicates the maximum rate at which data units may be transferred. Throughput is the actual rate that information is transferred. Latency is the delay between sending a communication and receiving the communication, and is mainly a function of a signal-travel-time. Jitter is a variation in the time of arrival of a communication at a receiver of the communication. Error rate is the number of corrupted bits expressed as a percentage or fraction of the total count of bits that have been sent.

In an embodiment, network security system 150 processes network performance data and uses the network performance data to generate statistical data reflecting performance of a network during certain time intervals. For example, network security system 150 may process network performance data collected during a particular time interval, and determine statistical network performance data for the network for the particular time interval. Examples of statistical data may include a count of connections established by devices 120, 122, 124 and network 160 during a particular time interval, or a count of file transfers initiated by devices 120, 122, 124 and devices in network 160 during a particular time interval. The statistical data may be stored in statistics database 130.

In an embodiment, network performance data is collected by one or more network security systems or devices other than network security system 150. For example, the network performance data may be collected by one or more specialized devices configured to monitor network traffic by probing the traffic, or using other network monitoring techniques.

Furthermore, network performance data may be processed by one or more devices other than network security system 150. For example, the network performance data may be processed by specialized statistical analyzers configured to generate network performance statistics data for a network.

Figure 3:
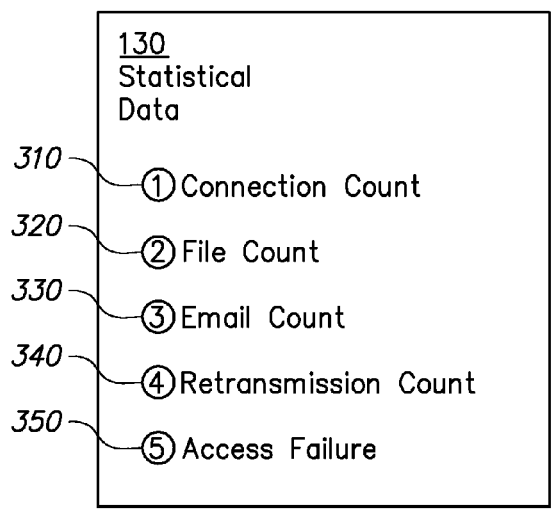
FIG. 3 illustrates an example of network performance statistical data.

FIG. 3 illustrates an example of network performance statistical data 130. The depicted example is provided to illustrate one of many sets of statistical information items that can be used to represent performance of a network. Depending on implementation, network performance statistical data may include some of the items depicted in FIG. 3, or additional items that are not depicted in FIG. 3.

Network performance statistical data may be stored in a statistics database 130, and may include many sets of statistical information items that reflect performance of a network. Non-limiting examples of such statistical data include a connection count 310, a file transfer count 320, an exchanged email count 330, a packet retransmission count 340, a data access failure 350, and the like.

Depending on implementations, connection count 310 may indicate a count of communications connections established between different devices. For example, in an embodiment, connection count 310 may indicate a count of communications connections established between network devices 120, 122 and 124 within a particular time period. The count may represent a cumulative count of the communications connections established at all communications layers, including an application layer, a session layer, a data packet layer, a segment layer, and the like. Alternatively, separate counts of communications connections established on each of the layers may be provided.

File transfer count 320 may indicate a count of a file transfers initiated and performed between network devices 120, 122 and 124 during a particular time period. Alternatively, file transfer count 230 may indicate a count of a file transfers initiated and performed between network devices 120, 122, 124 and devices in network 160 during a particular time period.

Exchanged email count 330 may indicate a count of emails exchanged between network devices 120, 122 and 124 during a particular time period. Alternatively, exchanged email count 330 may indicate a count of emails exchanged during a particular time period between network devices 120, 122, 124 and devices in network 160.

Packet retransmission count 340 may indicate a count of packets retransmitted between network devices 120, 122 and 124 during a particular time period. Alternatively, packet retransmission count 340 may indicate a count of packets retransmitted during a particular time period between network devices 120, 122, and 124 and devices in network 160.

Data access failure 350 may indicate whether a failure of a network device has occurred during a particular time period. For example, if a failure occurred during a particular time period, then data access failure 350 may indicate the device, or devices, that failed, or a count of devices that failed. Data access failure 350 may identify the failed device using an Internet Protocol (IP) address, a Media Access Control Address (MAC) address, or using any other form of a device's identification. Data access failure 350 may also include the time at which the failure occurred, or any other information associated with the failure.

Statistical data 130 may include other types of information, not described above. For example, statistical data 130 may include counts of messages, files, segments and/or packets received by each device in a network, counts of messages, files, segments and/or packets sent by each device, counts of duplicate messages, files, segments and/or packets sent by each device, counts of total bits sent by each device, counts of total bytes received by each device, a maximum round trip time in a communications connection, and a minimum round trip time in a communications connection. Other types of statistical data may also be included.

2.2. Intrusion Detection System

IDS 140 is a device or a software application configured to monitor data traffic in a network and determine whether any malicious activities or policy violations occurred in the network. Upon detecting such an activity or a violation, IDS 140 may generate reports and transmit the reports to a system administrator or a network management center. IDS 140 may be referred to as an anomaly detection system (ADS).

IDS 140 may be implemented as a network-based IDS (NIDS), a host-based IDS (HIDS), or an intrusion detection and prevention system (IDPS). IDPS may be configured to respond to a detected threat by attempting to prevent the threat from succeeding. This may be accomplished by employing various response techniques, including stopping the attack itself, changing the security environment, reconfiguring a firewall, or manipulating contents of the threat.

In an embodiment, IDS 140 is configured to identify possible incidents of malicious activities and suspicious traffic, logging information about the malicious activities/traffic, and reporting the violation attempts. IDS 140 may also be used to identify problems with security policies, document existing threats and deter individuals from violating security policies.

IDS 140 may be configured to record information related to observed events in a network, notify security administrators of important observed events, and produce reports.

However, IDS 140 may be configured to not provide detailed explanations of the causes of the malicious activities or policy violations because, from the perspective of the IDS, such explanations are difficult to generate. The problem is that the algorithms used by the IDS are usually very complex and typically the IDS is not designed to explain causes of the detected anomalies. In particular, the IDS may be implemented using several interconnected layers, where outputs from one layer is used as an input to the another layer. Furthermore, the IDS may analyze a multitude of patterns and features, and take into consideration lengthy sequence of time-based relationships established between events occurring in the network. This makes generating the explanations of the anomalies quite difficult.

In an embodiment, IDS 140 utilizes a signature-based approach to detect threats by monitoring data packets in a network. IDS 140 may look for patterns in sending data packets in the network, and match the patterns to signatures of the known security threats. IDS 140 may also track critical network characteristics in the real-time and generate an anomaly notification when an unidentified, and potentially threatening, event is detected in the network. IDS 140 may be implemented in a firewall network security system and may execute application designed to detect malware.

In an embodiment, a network environment depicted in FIG. 1 may comprise one or more IDS 140, each of which either cooperates with other IDS, or operates independently from other IDS.

2.3. Security Analysis System

In an embodiment, security analysis system 110 is configured to determine causes of anomalies detected in a network. Security analysis system 110 may determine the causes based on anomaly indications provided by IDS 140 and network performance data provided by network security system 150 or other devices.

In an embodiment, security analysis system 110 determines the causes without receiving information about the algorithms implemented in IDS 140 and without receiving information about the methodology that IDS 140 used in determining the indications of the suspicious traffic.

Security analysis system 110 may be configured to generate explanations of anomalies when the anomalies cannot be explained by IDS 140. It is not unusual for IDS 140 to be unable to determine or provide explanations of detected anomalies. Since IDS 140 may determine the anomalies by executing extremely complex algorithms, composed by many sub-detectors, whose outputs may be connected and aggregated with each other, determining straightforward explanations of the anomalies may be difficult. In some situations, deriving the explanations may require substantial modifications to IDS 140, and specifically, it may require substantial modifications to the detection algorithms implemented in IDS 140. In fact, in some cases, modifying some algorithms executed in IDS 140 may be impossible. On the other hand, providing just indications of anomalies occurring in the network may be insufficient to restore functionalities of the network. In fact, providing the explanations of the anomalies may be imperative in solving the problems in the network efficiently and quickly. Such explanations may be generated by security analysis system 110.

In an embodiment, security analysis system 110 receives network performance statistics data and anomaly indications, and based on the received information, identifies features in which the anomaly (also referred to as a suspicious sample) deviates from other features. This is the first step towards explaining why the anomaly is suspicious. Other steps may include normalizing the identified features, creating a mapping between the anomalies and the sets of unique features specific to the anomalies, and using the mapping to generate explanations of the anomalies.

Figure 2:
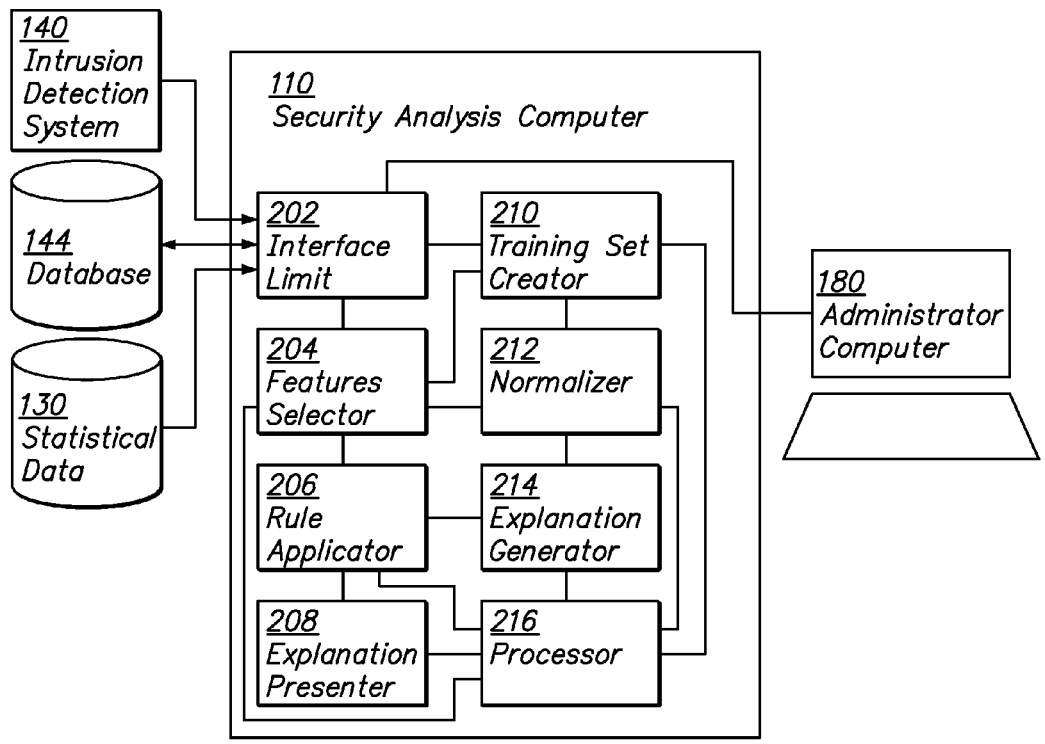
FIG. 2 illustrates an example of a security analysis computer.

FIG. 2 illustrates an example of a security analysis computer 110. In an embodiment, security analysis computer 110 comprises an interface unit 202, a training set creator 210, a features selector 204, a normalizer 212, a rule applicator 206, an explanation generator 214, an explanation presenter 208, and one or more processors 216.

In an embodiment, security analysis computer 110 uses interface unit 202 to communicate with IDS 140, databases 144, 130 and administrator computer 180. For example, security analysis system 110 may use interface unit 202 to retrieve network performance data from statistical database 130, receive indications of detected anomalies from IDS 140, and present explanations of the detected anomalies to administrator computer 180.

Upon receiving network performance data and network anomaly information, the network performance data may be normalized. Features selector 204 may identify features representative of the detected anomalies. Rule applicator 208 may generate a set of explanation rules. The set of explanation rules may be used by explanation generator 214 to generate explanations of the anomalies detected by IDS 140. Explanation presenter 208 may present the generated explanations to users, including a system administrator.

In an embodiment, components 202-216 of security analysis system 110 are also used to process additional network performance data and additional network anomaly information, and use the additional data to generate new or additional explanations for newly detected anomalies.

Security analysis system 110 may be implemented either separately from IDS 140 or as part of IDS 140. For example, security analysis system 110 may be incorporated into IDS 140, or may be communicatively coupled with the circuits of IDS 140. For example, security analysis system 110 may be implemented to communicate with IDS 140, or be fully integrated into IDS 140.

In an embodiment, security analysis system 110 treats IDS 140 as a black box. Hence, security analysis system 110 may receive indications of the anomalies from IDS 140 (black box), but rarely receives explanations of the detected anomalies or how/why the anomalies were detected. Security analysis system 110 may process the received information to determine the causes of the detected anomalies without receiving any additional information from IDS 140.

Computational complexity of security analysis system 110 is usually different than computational complexity of IDS 140. Two different implementations of the proposed solution have been experimentally verified in numerous domains including intrusion detection. Experiments have revealed that training security analysis system 110 may be performed using a small number of training samples, while training IDS 140 often requires a large set of training data. Hence, the computational complexity of security analysis system 110 that determines explanations of the anomalies may be smaller than the computational complexity of IDS 140 that detects the anomalies.

In an embodiment, security analysis system 110 is implemented to verify whether IDS 140 provides information that the vendor of IDS 140 asserted to provide. This may be especially important in highly secure networks in which assertions advanced by a vendor and a service provider are highly scrutinized. For example, a highly secure network may be sensitive to a particular type of attacks, and determining whether the attacks are indeed identified by IDS 140 may be critical.

Further, in situations when IDS 140 provides not only indications of the anomalies, but also some explanations of the detected anomalies, security analysis system 110 may be used to verify whether the explanations provided by IDS 140 are reasonable and accurate.

2.4. Administrator Computer

Administrator computer 180 is any computer system that a system administrator may use to configure, monitor, repair and maintain a computer network. Administrator computer 180 may be used to install and upgrade computer components in the network, maintain the network and network devices, and troubleshoot the devices and connections in the network.

Administrator computer 180 may be also configured to communicate with security analysis computer 110, IDS 140 and one or more databases 130, 144. For example, using administrator computer 180, a system administrator or a network operator may request information from security analysis computer 110, IDS 140, and databases 130, 144.

A system administrator may specify that the information to be provided periodically, or upon a request. For example, a system administrator may request that security analysis computer 110 provide information about the causes of anomalies occurring in the network each time an anomaly is detected by IDS 140. The system administrator may also request that security analysis computer 110 provide periodical summaries of the causes of the anomalies that occurred within a particular period of time, such as a week, a month, or the like. The system administrator may also request information from security analysis computer 110 each time the system administrator receives from IDS 140 an indication of a system failure or malfunctioning. The system administrator may also request that security analysis computer 110 provide information about the causes of anomalies for the anomalies that pertain to certain sub-network or devices, or for the anomalies for which certain measures exceed certain threshold values.

3. Collecting Network Performance Statistics Data

Network performance data may be collected by one or more systems executing data collecting and processing tools. For example, network performance data may be collected by a network monitor, a network security system or any other device or application configured to monitor the network traffic and components of the network.

In an embodiment, network security system 150 collects information about a network and takes an inventory of network devices in the network. After taking the inventory, network security system 150 may monitor the traffic transmitted across the network infrastructure and determine an overall network utilization of the network.

While an overall network utilization is a reasonable indicator of the overall health of a network, network security system 150 may also collect information about utilization of individual devices and individual network connections. For example, network security system 150 may determine measures of the utilization of the network components and connections, and collect information about transmitted data packets, data segments, or other data communications units communicated to and from the devices in the network.

Information about data packets may be collected using a variety of approaches. One of them includes data capture or "sniffing." In this approach, network security system 150 captures a stream of network data and provides the network data to an analyzer. The analyzer uses the network data to generate statistics and metrics for the network. This approach usually provides more data than is actually needed, and thus may make identifying anomalies in the network difficult.

According to another approach, information about data packets is requested by data capture tools. The requests may be transmitted by probes, and time-schedules may be implemented to request the information from components in the network according to the schedules. Other methods for collecting information about data packets, segments or other data communications units, exchanged within the network, may also be used.

Upon receiving information about data packets, network security system 150 or any other data analyzer may perform a data analysis, and determine trends in usage of applications, devices, communications links, and the like. The information may also be processed to determine trends in the usage within certain time periods. For example, network security system 150 may determine a percentage of utilization of certain applications against a total network usage, or a percentage of the idle time of each of the network devices against a total network usage.

4. Network Performance Features

In an embodiment, security analysis computer 110 is configured to collect network performance data and performance statistics, and use the collected information to determine features that are specific to detected anomalies. For example, based on collected network performance information, security analysis computer 110 may determine one or more features that are representative of an anomaly detected by IDS 140.

Figure 4:
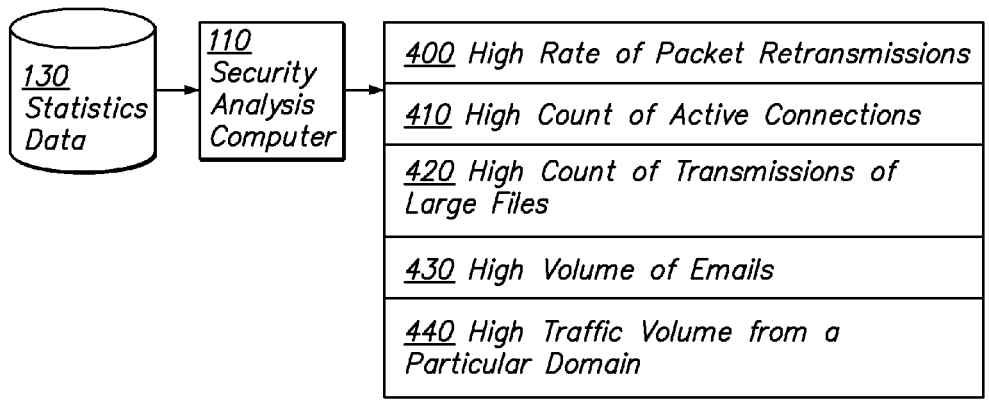
FIG. 4 illustrates examples of features.

FIG. 4 illustrates examples of features. The examples are provided to illustrate the types of features that security analysis computer 110 may identify based on statistics data 130, including network performance data. Depending on the implementations, the actual features may include some or all of the features illustrated in FIG. 4, or may include additional features not illustrated in FIG. 4.

Non-limiting examples of the features may include a high rate of packet retransmissions 400, a high count of active connections 410, a high count of transmissions of large files 420, a high volume of emails 430, a high traffic volume from a particular domain 440, and the like. Other examples and types of features not mentioned above, may also be used by security analysis computer 110.

Security analysis computer 110 may identify high rate packet retransmissions 400 based on statistics data 130 by identifying in statistics data 130, or computing from statistical data 130, a count of the packets that have been retransmitted in the network within a certain period of time, and comparing the count with a retransmission-count-threshold value. If the count exceeds the threshold value, then security analysis computer 110 may determine the feature of "high rate of packet retransmission 400," and associate the feature with a time stamp indicating the time period during which the high rate of packet retransmission has occurred.

Security analysis computer 110 may identify high count of active connections 410 based on statistics data 130 by identifying in statistics data 130, or computing from statistical data 130, a count of the active connections that have been established in the network within a certain period of time, and comparing the count with an active-connections-threshold value. If the count exceeds the threshold value, then security analysis computer 110 may determine the feature of "high count of active connections 410," and associate with that feature a time stamp indicating the time period during which the high count of active connections has occurred.

Security analysis computer 110 may identify a high count of transmissions of large files 420 based on statistics data 130 by identifying in statistics data 130, or computing from statistical data 130, a count of transmissions of large files that have occurred in the network within a certain period of time, and comparing the count with a large-file-transmission-threshold value. If the count exceeds the threshold value, then security analysis computer 110 may determine the feature of "high count of transmissions of large files 420," and associate with that feature a time stamp indicating the time period during which the high count of transmission of large files has occurred.

Security analysis computer 110 may identify a high volume of emails 430 based on statistics data 130 by identifying in statistics data 130, or computing from statistical data 130, a volume of emails that have been exchanged in the network within a certain period of time, and comparing the volume with an email-volume-threshold value. If the count exceeds threshold value, then security analysis computer 110 may determine the feature of "high volume of emails 430," and associate with that feature a time stamp indicating the time period during which the high volume of email has occurred.

Security analysis computer 110 may identify a high traffic volume from a particular domain 440 based on statistics data 130 by identifying in statistics data 130, or computing from statistical data 130, a volume of traffic initiated from the particular domain within a certain period of time, and comparing the count with a traffic-volume-threshold value. If the count exceeds the threshold value, then security analysis computer 110 may determine the feature of "high traffic volume from a particular domain 410," and associate with that feature a time stamp indicating the time period during which the high traffic volume from the particular domain has occurred.

5. Anomalies

A network anomaly is a sudden deviation from a normal operation of the network. Some of the anomalies are accidental events caused by errors or malfunctioning of components of the network. Such anomalies may include occurrences of failures of network components, occurrences of an unusually heavy traffic generated by users, and the like. Other anomalies may be caused by intruders who, with malicious intent, launch for example, attacks on the entire network, attacks on secure resources of the network, and the like.

Depending on a severity of the anomaly, a system administrator of a network may initiate one or more actions to either resolve the problem or secure the network from the consequences of the anomaly. Very often, the quicker the anomaly is detected in the network, the quicker the system administrator can respond to the anomaly. Hence, a quick detection of the anomalies may be critical in protecting the network from intrudes.

In an embodiment, IDS 140 is treated as a black box, and it is expected to merely provide indications of network anomalies. Such indications are often insufficient for a system administrator to determine how to solve the anomaly issue and how to protect the network from the consequences of the anomaly.

Figure 5:
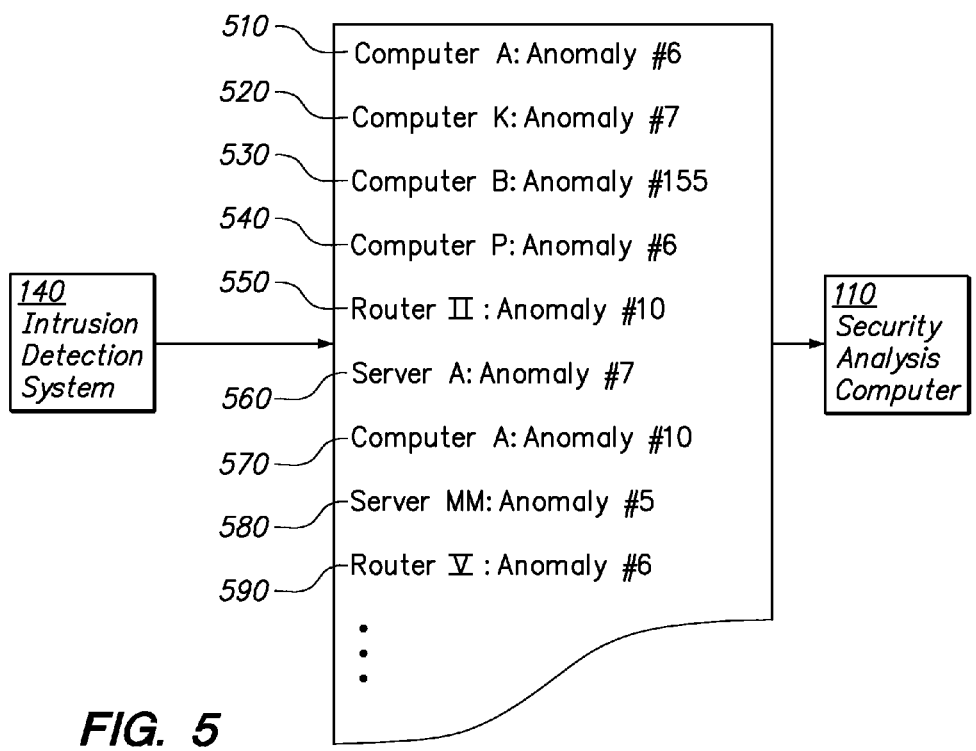
FIG. 5 illustrates examples of anomalies.

FIG. 5 illustrates examples of anomalies. Depending on the implementations and the state of the network and network devices, the actual anomalies may include some or all of the anomalies illustrated in FIG. 5, or may include additional anomalies not illustrated in FIG. 5.

Information about anomalies may be provided by IDS 140 in a variety of forms. For example, an anomaly may be described by providing an indicator of a computer system on which the anomaly was detected or has occurred, and an indicator of the anomaly.

An indicator of the computer system on which an anomaly has occurred or was detected may be represented using a code, a word, a phrase, or the like. For example, an indicator may include a name of the computer, an IP address of the device, a type of the device, and the like. In the examples illustrated in FIG. 5, indicators of the devices are represented by the type of the device, which may be a computer, a router, or a server; and the name of the device, which may be A, K, B, P, II, MM, or V.

An anomaly indicator may be represented using a code, a word, a phrase, or the like. For example, an anomaly may be indicated by an alphanumeric code, indicating one of the codes from a list of codes, which IDS 140 provided to security analysis computer 110 in advance. In the examples illustrated in FIG. 5, anomaly indicators are represented by the word "Anomaly" and an anomaly number.

Examples 510-590 illustrated in FIG. 5 include the following anomalies: Computer A: Anomaly #6 510; Computer K: Anomaly #7 520; Computer B: Anomaly #155 530; Computer P: Anomaly #6 540; Router II: Anomaly #10 550; Server A: Anomaly #7 560; Computer A: Anomaly #10 570; Server MM: Anomaly #5 580; and Router V: Anomaly #6 590. The examples are provided merely to illustrate one or many ways of representing information indicating detected anomalies.

6. Normalization of Feature Values

In an embodiment, after identifying network performance features, security analysis computer 110 assigns values to the features, and if needed, normalizes the values. For example, if a particular feature corresponds to "a high rate of packet retransmissions," then, based on statistics data 130, security analysis computer 110 may determine a rate of the packets retransmitted within a particular period of time, and, if necessary, normalize the rate. For example, if security analysis computer 110 determines that a rate of the packets retransmitted within a one-minute-interval is "100," then security analysis computer 110 may associate the value of "100" to the feature of "high rate of packet retransmissions." Furthermore, using a default maximum value of retransmissions and a default minimum value of retransmissions, security analysis computer 100 may normalize the feature value.

Figures 6, 7:
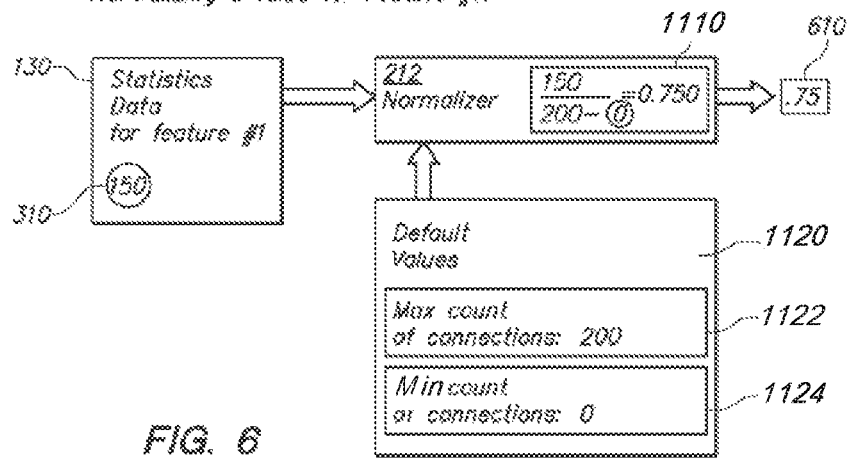
FIG. 6 illustrates an example of a feature normalization process.
FIG. 7 illustrates an example of a mapping between anomalies and features.

FIG. 6 illustrates an example of a feature normalization process. The depicted example illustrates a process of normalizing a value of feature #1, which, in this example, corresponds to a "high count of active connections," depicted in FIG. 4 as element 410.

In an embodiment, statistics data 130 for features are provided to a normalizer 212. Normalizer 212 may be implemented as a component of security analysis computer 110, or may be implemented in a device that cooperates with security analysis computer 110.

In an embodiment, normalizer 212 receives statistics data 130, processes statistics data 130 to identifies one or more features, normalizes values of the identified features, and outputs normalized values for the features. For example, upon receiving statistics data 130, normalizer 212 may analyze statistics data 130, identify data pertaining to information about active connections established in the network, and determine that the count 310 of the active connections established in the network is "150." Then normalizer 212 may proceed to normalizing the value of "150."

Normalization of feature values may be performed using various approaches. For example, normalizer 212 may use default ranges for the values of the features.

In an embodiment, normalizer 212 accesses a data storage configured for storing default values for parameters associated with features identified by security analysis system 110. The parameters and the default values for the parameters may be created when service analysis system 110 receives and processes statistics data. For example, upon receiving information about active connections established in the network, service analysis computer may either generate the parameters for the feature, or may request that the parameters and their values be manually entered into the system. The parameters and the values may be entered by a system administrator, or may be retrieved from a database.

In the example depicted in FIG. 6, default values 1120 associated with a feature pertaining to a count of active connections established in a network include at least a maximum count of connections value 1122, and a minimum count of connections value 1124. In the example, the maximum count of connections value is "200," and the minimum value of connections value is "0." That means that for a given network and for a given time period, the maximum number of active connections that can be established is "200," and the minimum number of active connections is "0."

In an embodiment, for a given feature, normalizer 212 retrieves default values 1120, and computes a normalized value 1110. In the depicted example, normalized value 1110 is computed by dividing the value associated with the feature by a difference between the maximum default value and the minimum default value for the feature. If the feature value is "150," and the difference between the maximum default value and the minimum default value for the feature is "200-0," then normalized value 1110 is 150/200=0.0750. The normalized value 1110 of the feature in this example is "0.0750".

In an embodiment, normalized value 910 may be rounded using any known data rounding techniques. For example, normalized value 910 may be rounded to two significant decimal digits. In the depicted example, normalized value 910 may be rounded to "0.75", as depicted in box 610.

7. Generating Mappings Between Anomalies and Features

FIG. 7 illustrates an example of a mapping 700 between anomalies and features. The mapping depicted in FIG. 7 is one of many forms of representing relationships between anomalies and features. In the depicted example, the relationships are represented using a table that has rows and columns. The anomalies are associated with the rows, and the features are associated with the columns.

The depicted example illustrates a mapping 700 that has three rows 510, 520, and 530, and four columns 710, 720, 730 and 740. Other tables may have additional rows and additional columns. Row 510 indicates that anomaly #6 has occurred on, or in relation to, computer A. Row 520 indicates that anomaly #7 has occurred on, or in relation to, computer K. Row 530 indicates that an anomaly #155 has occurred on, in relation to, computer B. Information about the anomalies may be provided by IDS 140, or any other system configured to detect and identify anomalies in a network.

Information provided by IDS 140 may be represented as it is depicted in rows 510, 520 and 530, or any other form. For example, IDS 140 may provide information about anomalies in reference to a group of communications devices, in reference to a group of communications links, in reference to a group of sub-networks, and the like. In such an example, security analysis computer 110 may process the received information about the anomalies, and generate information indicating a correspondence between individual devices and anomalies, between individual communications links and anomalies, between individual sub-networks and anomalies, and the like.

Columns 710, 720, 730 and 740 are associated with features determined or identified by security analysis system 110 based on statistics data 130, received from a network security device, such as network security system 150, or any other device. In mapping 700, column 710 depicts the first feature (high rate of packet retransmissions), column 720 depicts the second feature (high count of active connections), column 730 depicts the third feature (high count of transmissions of large files), and column 740 depicts the fourth feature (high volume of emails).

In an embodiment, if security analysis system 110 determines that a particular feature is associated with a particular anomaly, then a value of the feature is computed based on the statistics data corresponding to the detected particular anomaly, and the computed value is entered into mapping 700 at the intersection of the column corresponding to the particular feature and the row corresponding to the particular anomaly. For example, if security analysis system 110 determines that the feature #1 in column 710 is associated with the anomaly #6 occurring on computer A, then security analysis system 110 may compute a value of the feature #1, and enter the computed value into mapping 700 at the intersection of column 710 and row 510.

In an embodiment, determining features associated with anomalies is a feature selection problem, in which the goal is to identify features that best separate the singly anomalous data from the rest of the normal traffic. The feature selection problem is well understood in the machine-learning literature, and can be solved using many methods, none of which is preferred over another in this disclosure.

There are many ways in which security analysis system 110 may determine whether a particular feature is associated with a particular anomaly. For example, if the information about the anomalies and the statistics data are time-stamped, then security analysis system 110 may compare the time stamps associated with the anomalies and the time stamps associated with the statistics data, and determine whether there is any time-based correspondence or correlation between the anomalies and the features. This may be illustrated using the following example: if a particular anomaly was detected at 12:32:34 on a particular day, and the time stamps associated with one or more particular statistics data items are a few seconds prior to the 12:32:34, then security analysis system 110 may determine that features identified based on the particular statistics data items may be associated with the particular anomaly. Hence, security analysis system 110 may compute values for the features, and enter the computed values into mapping 700 in the fields as described above.

According to another example, security analysis system 110 may determine whether a particular feature is associated with a particular anomaly based on relationships between statistics data and devices on which anomalies have been detected. For example, if statistics information pertaining to computer A and anomaly information pertaining to computer A have been received, then security analysis system 110 may correlate the statistics information for computer A with the anomaly information for computer A. Hence, if statistics data items pertaining to computer A have been received, and anomaly #6 has been detected on computer A, then security analysis system 110 may determine that the features identified from features #1 and #4 may be associated with anomaly #6 occurring on computer A. Other approaches for determining whether a particular feature is associated with a particular anomaly may also be used.

In example depicted in FIG. 7, security analysis system 700 determined that features #1, and #4 have non-zero values when associated with anomaly #6 occurring on computer A. For example, security analysis system 110 may compute a value of "0.75" for feature #1 associated with anomaly #6 occurring on computer A, and enter the value of "0.75" into mapping 700 into a data field 610 located at the intersection of row 510 and column 710. Further, security analysis system 110 may determine that feature #4 is associated with anomaly #6 occurring on computer A, compute a value of the feature #4 for anomaly #6 occurring on computer A, and enter that value ("0.3") into mapping 700 into a data field 620 located at the intersection of row 510 and column 740. Moreover, security analysis system 110 may determine that feature #3 is associated with anomaly #155 occurring on computer B, compute a value of that feature for that anomaly, and enter the value of "0.3" into mapping into a data field 630. Furthermore, security analysis system 110 may determine that feature #4 is associated with anomaly #155 occurring on computer B, compute a value of that feature for that anomaly, and enter the value of "0.9" into a data field 640.

In an embodiment, a lack of correspondence between a particular feature and a particular anomaly may be represented in mapping 700 by entering a value of "0" into a data field that is located at the intersection of the column corresponding to the particular feature and the row corresponding to the particular anomaly. Alternatively, such data fields may be marked using a special code, a special alphanumeric string, or other indicator that shows that the association between the particular feature and the particular anomaly is not present.

8. Rules

Determining an explanation of the anomaly may be viewed as a feature selection and classification problem. One of the goals is to identify one or more features which uniquely identify a particular anomaly, and by which the particular anomaly is separated from other anomalies.

One of the reasons for choosing decision trees to determine explanations of the anomalies is the fact that the decision trees implement a simple greedy approach, and decision rules derived by an application of the greedy approach may be easily interpreted. The algorithms executed to determine the explanations are light-weight because the complexity of growing decision trees is small. Due to the light-weight complexity of the algorithms, the algorithms may deliver the explanations in the real-time even if the algorithms utilize access to large databases or a variety of resources.

In an embodiment, a set of samples $X=\{x_i \in R^d | \epsilon \{1, \ldots 1\}$ is classified by an intrusion detection system into two classes: a class with normal samples $X^n$ and a class of samples with anomalies $X^a$. Hence, the set of samples X comprises normal samples $X^n$ and samples with anomalies $X^a$. By the nature of the problem, it is expected that $\|X^n\| << \|X^a\|$, wherein $\|X^n\|$ indicates a count of elements in $X^n$, and $\|X^a\|$ indicates a count of elements in $X^a$.

In an embodiment, a system analysis system receives a set of normal samples $X^n$ and a set of samples with anomalies $X^a$. The two sets may be referred to as a training set. Based on the training set, a binary decision tree is generated. From the binary decision tree, a set of rules for generating explanations of the anomalies is generated. As new samples with or without anomalies are received, the binary decision tree may be modified and refined, and so may be the rules and the explanations.

To answer how $x^a \in X^a$ differs from a set of normal samples $X^n$, a security analysis system generates a binary decision tree allowing separating normal samples from anomalies samples. As the elements in the anomaly set are processed, new nodes and links are added to the binary decision tree. Various strategies and approaches may be utilized in generating the decision tree and determining how the new leaves are added to the tree.

One of the objectives in generating a binary decision tree is to derive rules for determining a minimal set of features that are indicative of an anomaly. A minimal set of features that are indicative of an anomaly is a set of features that uniquely distinguishes one anomaly from non-anomalies.

In an embodiment, based on one or more binary decision trees, one or more rules are derived for each of the anomalies received in a training set. Depending on the type of anomalies and the type of features, the rules may be simple or complex. For example, one rule may state that a particular anomaly occurs when the value of feature #1 is smaller than the value of feature #6. Another rule may state that a particular anomaly occurs when the value of feature #1 is greater than values of the majority of other features.

A few examples of rules are provided in reference to mapping 700 depicted in FIG. 7. The examples are hypothetical and do not correspond to any particular real-time situation. Based on the set of samples without anomalies $X^n$ and the set of samples without anomalies $X^a$, one or more decision binary trees have been created. Based on both sets and statistics data, mapping 700, depicted in FIG. 7, has been created.

From mapping 700, depicting anomalies 510, 520, and 530, a unique set of features (or feature values) may be determined. For example, anomaly #6 occurs on computer A when feature #1 has a value of 0.75 and feature #4 has a value of 0.4. It is also possible that anomaly #6 occurs on computer A when feature #1 has a value equal or greater than 0.75 and feature #4 has a value equal or less than 0.3. The rule may be refined as additional anomalies and features are processed.

It appears that based on mapping 700, features #1 and features #4 are significant in distinguishing anomaly #6 from anomalies #7 and #155, while features #2 and #3 are not. However, anomaly #6 is not distinguishable just based on feature #1 or just based on feature #4 because each of those features is significant in distinguishing other anomalies as well. Furthermore, anomaly #6 is not distinguishable just based on feature #2 or #3 because those features appear to be significant in distinguishing other anomalies, too. Hence, anomaly #6 cannot be distinguished using just one feature.

However, anomaly #6 may be distinguished from other anomalies depicted in FIG. 7 by at least two features, including feature #1 and feature #4. Since both features #1 and #4 appear to be also significant in distinguishing other anomalies, a rule for distinguishing anomaly #6 needs to take into consideration unique value ranges associated with the corresponding features #1 and #4. In this example, based on additional statistics data and anomaly data, a security analysis system may determine that anomaly #6 occurs on computer A if the value of feature #1 is equal or greater than 0.75, and the value of feature #4 is equal or less than 0.3. The rule may be expressed as:

$$\text{Anomaly \#6 occurs if ((value of feature \#1>=0.75)} \text{ and (value of feature \#4<=0.3))} \tag{1}$$

The above rule allows identifying anomaly #6 occurring on computer A based on unique values of feature #1 and feature #4. The unique ranges of values of features #1 and #4 allow identifying anomaly #6 from other anomalies in a training set.

A unique set and the corresponding rule may be used to generate an explanation for anomaly #6. For example, if a security analysis system receives, from IDS 140, an indication that anomaly #6 has been detected on computer A, then the security analysis system may invoke rule (1), and use rule (2) to generate an explanation for the anomaly. Assuming that feature #1 corresponds to a high rate of packet retransmissions, and feature #4 corresponds to a high volume of emails, then, based on the rule (1), the security analysis system may determine that anomaly #6 occurred on computer A because the rate of packet retransmissions on computer A was equal or greater than 0.75 and the volume value of emails processed by computer A was equal or less than 0.3. Such an explanation of the anomaly is derived using a simple decision tree approach and without any knowledge of the multi-layered algorithms used by an intrusion detection system in detecting the anomaly.

Based on mapping 700, a security analysis system may also determine that anomaly #155 occurs on computer B when feature #3 has a value equal or greater than 0.3 and feature #4 has a value equal or greater than 0.9. It may be observed that both features #3 and features #4 are significant in distinguishing anomaly #155 from anomalies #6 and #7, while features #1 and #2 are not. For example, anomaly #155 is not distinguishable just based on feature #3 or just based on feature #4 because each of those features is significant in distinguishing other anomalies as well. Furthermore, anomaly #155 is not distinguishable just based on feature #1 or #2 because those features appear to be significant in distinguishing other anomalies. Hence, anomaly #155 cannot be distinguished using just one feature.

However, anomaly #155 may be distinguished from other anomalies depicted in FIG. 7 by at least two features, including feature #3 and feature #4. Since both features #3 and #4 appear to be significant in distinguishing also other anomalies, a rule for distinguishing anomaly #155 needs to take into consideration unique value ranges associated with the corresponding features #3 and #4. In this example, based on additional statistics data and anomaly data, a security analysis system may determine that anomaly #155 occurs on computer B if the value of feature #3 is equal or greater than 0.3 and the value of feature #4 is equal or greater than 0.3. The rule may be expressed as:

$$\text{Anomaly \#155 occurs if ((value of feature \#3>=0.3)} \text{ and (value of feature \#4<32 0.9))} \tag{2}$$

The above rule allows identifying anomaly #155 occurring on computer B based on unique values of feature #3 and feature #4. The unique set of values of features #3 and #4 allows identifying anomaly #155 from other anomalies in the training set.

A unique set and the corresponding rule may be used to generate an explanation for anomaly #155 when such an anomaly is detected by an intrusion detection system. For example, if a security analysis system receives, from the intrusion detection system, an indication that anomaly #155 has been detected on computer B, then the security analysis system may invoke rule (2), and use rule (2) to generate the explanation for the anomaly. Assuming that feature #3 corresponds to a high count of transmissions of large files, and feature #4 corresponds to a high volume of emails, then, based on rule (2), the security analysis system may determine that anomaly #155 occurred on computer B because the count of transmissions of large files on computer B was equal or greater than 0.75 and the volume value of emails processed by computer B was equal or greater than 0.3. Such an explanation of the anomaly is derived using a simple decision tree approach and without any knowledge of the multi-layered algorithms used by an intrusion detection system in detecting the anomaly.

9. Determining an Explanation of a Network Anomaly

Figure 8:
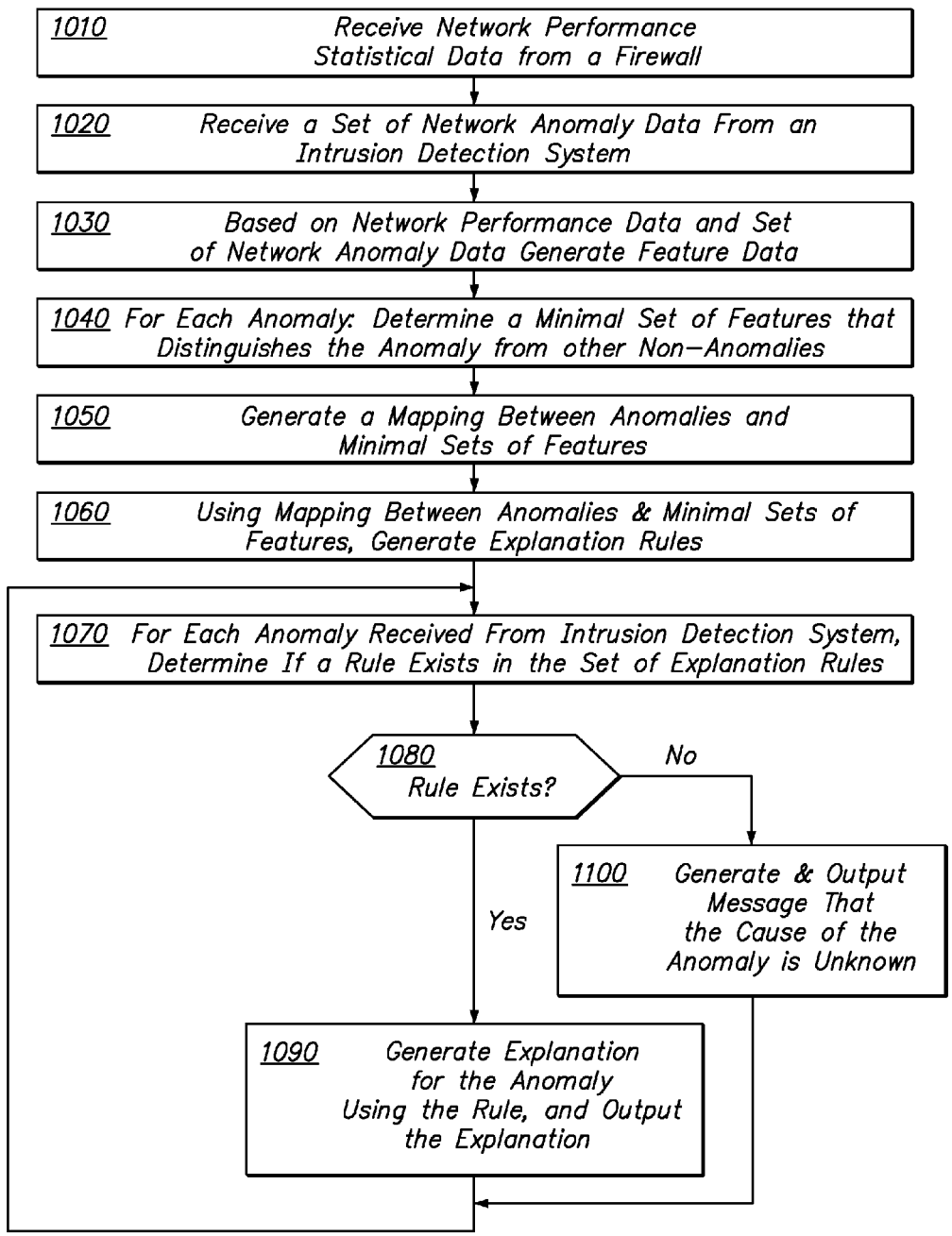
FIG. 8 illustrates a flow chart for a process for generating explanations of network anomalies.

FIG. 8 illustrates a flow chart for a process for generating explanations of network anomalies. In step 1010, a security analysis system retrieves network performance statistical data for a computer network. The security analysis system may receive the network performance statistical data from one or more statistics databases, or any other source configured to provide such data. Alternatively, the security analysis system may request the network performance statistical data from a firewall, or other device configured to collect and process network performance data.

In an embodiment, network performance statistical data may include various network performance measures obtained by processing network performance data collected from a network within a particular time period. For example, the network performance statistical data may include a count of retransmitted packets within the particular time period, a count of communications connections established during the particular time period, and the like.

In step 1020, a security analysis system receives network anomaly data from IDS. The network anomaly data may indicate one or more anomalies that have occurred in the network. For example, if the IDS determined that a particular network device in a computer network was transmitting an unusual amount of emails within a particularly short period of time, and transmitting such an unusual amount of emails within such a short period of time causes a concern, then the IDS may generate network anomaly data and transmit the network anomaly data to the security analysis system.

In an embodiment, network anomaly data generated and provided by IDS may include information about one or more anomalies. Each of the anomalies may be identified by an identifier, a brief description, or the like. For example, an anomaly may be identified by an anomaly identifier, which may be a code, an alphanumeric phrase that describes the anomaly, or a similar form of the identifier. The anomaly identifier rarely provides enough information to a system administrator to determine the cause or source of the anomaly. Upon receiving only the anomaly identifier or the anomaly code, a system administrator would not be able to identify the source of the problem.

In step 1030, a security analysis system generates feature data based on network performance data and a set of network anomaly data. In this context, the term network performance data may refer to either the network performance data or network performance statistics data, or both. For example, if the security analysis system receives both the network performance data and the network performance statistical data, then the security analysis system may use both types of data and the set of network anomaly data to generate the feature data.

In an embodiment, feature data may include information about the features that are identifiable based on network performance data and a set of anomaly data. For example, if a service analysis system receives network performance statistical data indicating that a significantly large count of communications connections has been established from a particular network device within a particular time period, then the security analysis system may generate a feature corresponding to a high connection count. Generating such a feature may include generating a name, an identifier or a code for the feature and a description of the feature.

In an embodiment, a security analysis system may associate a name of the feature with the description of the feature, and store a pointer to the association between the feature's name and the feature's description in a lookup table. Other methods for generating descriptions of the features and making the features available for future uses may also be included.

For example, upon receiving network anomaly data indicating that a particular network device has been frequently rebooted within the last two days, a service analysis system may generate a feature for a device failure. The security analysis system may generate a name, a code or an identifier for the feature, and may also generate a brief description of the feature. Furthermore, the security analysis system may associate the name/identifier/code with the description of the feature, generate a pointer to the association and save the pointer in a lookup table.

In an embodiment, a security analysis system generates a mapping between detected anomalies and features identified for the anomalies. The mapping may be created in a variety of ways, and some examples of the mappings have been described in previous sections. For example, a mapping may be represented using a table in which rows correspond to the detected anomalies, columns correspond to the features identified for the anomalies, and a table element for a particular anomaly and a particular feature may have an associated value indicating the strength of the particular feature for the particular anomaly.

In step 1040, a security analysis system determines, for each anomaly, a minimal set of features that distinguishes the anomaly from non-anomalies. For example, if a security analysis system created a mapping between the anomalies and the features, then the security analysis system may use the mapping to determine, for each anomaly, a minimal set of features that distinguishes the anomaly from non-anomalies.

In an embodiment, determining, for each anomaly, a minimal set of features that distinguishes the anomaly from non-anomalies may be performed by analyzing a mapping between the anomalies and eliminating those features that are associated with other anomalies. For example, if a particular feature is associated with all anomalies, then relying on the particular feature to distinguish one anomaly from non-anomalies may be difficult. In such a situation, the security analysis system may eliminate the particular feature from the minimal sets of features for the anomalies.

According to another example, if a first feature is associated with a first set of anomalies, but not with a second set of anomalies, then a security analysis system may include the first feature in the minimal set of features for each anomaly of the first set of anomalies, and exclude the first feature from the minimal set of features for each anomaly of the second set of anomalies. The process may continue for each feature in the mapping and for each anomaly. For example, if a second feature is associated with a third set of anomalies, but not with the fourth set of anomalies, then the security analysis system may include the second feature in the minimal set of features for each anomaly of the third set of anomalies, and exclude the second feature from the minimal set of features for each anomaly of the fourth set of anomalies. The process may continue until a minimal set of features for each anomaly is determined in such a way that the minimal set of features for the anomaly unambiguously distinguishes the anomaly from non-anomalies.

In step 1050, a mapping between anomalies and minimal sets of features is determined. In an embodiment, the mapping may represent relationships between the anomalies and the features that have been identified as significant in distinguishing one anomaly from non-anomalies. An example of the mapping is described in FIG. 7.

In step 1060, explanation rules are generated based, at least in part, on a mapping between anomalies and features. For example, using a mapping depicted in FIG. 7, one or more rules for generating explanations for anomalies #6, #7 and #155 of FIG. 7 may be generated. Rules are used to distinguish an anomaly from non-anomalies and allow generating explanations of the anomalies. The rules may be referred to as explanation rules.

In an embodiment, rules include one or more threshold values. For example, a rule may specify that a particular anomaly occurs when a value of a particular feature exceeds a particular threshold value. According to another example, a rule may specify that a particular anomaly occurs when a value of one feature exceeds one threshold value and a value of another feature exceeds another threshold value. Other rules may specify different conditions and combinations of conditions.

Threshold values may be particularly useful if a particular feature is associated with a plurality of anomalies. Threshold values may be used to determine ranges of values of the particular feature. The ranges may be used in generating the rules. For example, a rule may specify that a particular anomaly occurs when a value of a particular feature falls into a particular range of values, of when a value of another feature falls into another range of values.

In step 1070, for each anomaly received from IDS, a security analysis system determines whether a rule exists in the set of explanation rules. For example, if an indication of anomaly #6 occurring on computer A is received from the IDS, then the security analysis system may try to determine in step 1080 whether the rule for such an anomaly has been generated.

If so, then in step 1090, the security analysis system generates an explanation of the anomaly #6 using the rule. For example, if the security analysis system determines that rule (1), described above, has been generated for anomaly #6 occurring on computer A, then the security analysis system may use rule (1) in generating the explanation.

In step 1090, a security analysis system uses the rule to generate an explanation of the detected anomaly. For example, if the security analysis system received an indication from the IDS that anomaly #6 has occurred on computer A, and determined that rule (1), described above, applies when such an anomaly is detected, then the security analysis system may use rule (1) in generating the explanation of the anomaly.

Rule (1), as described above, states that anomaly #6 occurs if ((value of feature #1>=0.75) and (value of feature #4<=0.3)). Assuming that feature #1 corresponds to a high rate of packet retransmissions, and feature #4 corresponds to a high volume of emails, then, based on rule (1), a security analysis system may generate the following explanation:

> Anomaly #6 occurred on computer A because the rate of packet retransmissions on computer A was equal or greater than 0.75 and the volume value of emails processed by computer A was equal or less than 0.3.                                  (3)

The above example is provided to merely illustrate a particular anomaly, a particular rule and a particular explanation. In case of other anomalies and rules, the explanation may be different. Furthermore, the phrasing of the explanation may be different, and the form of the explanation may be different.

However, if in step 1080, a security analysis system determined that no rule has been generated for the anomaly that has been detected, then in step 1100, the security analysis system may generate and output a message indicating that the cause of the detected anomaly is unknown.

Alternatively, if a security analysis system determined that no rule has been generated for a particular anomaly, then the security analysis system may try to generate one or more rules for the particular anomaly. This may be accomplished by repeating the steps 1010-1070, described above. For example, the security analysis system may receive (or request) from a firewall, network performance statistical data that was collected contemporaneously with detecting the particular anomaly. Furthermore, the security analysis system may generate feature data based on the received network performance data, determine a minimal set of features that distinguish the particular anomaly from non-anomalies, update a mapping between the anomalies and the features, and use the updated mapping to generate new explanation rules. The new explanation rules may include a rule of explaining the particular anomaly, and rules for explaining other anomalies. The rules for explaining other anomalies may or may not correspond to the rules generated in the previous cycle. For example, since the new rules have been generated based on additional network performance statistical data, the new rules may be different (or more accurate) than the rules generated without the additional network performance statistical data.

In an embodiment, as a security analysis system receives indication of new anomalies detected in a network, the security analysis may use the information about the new anomalies and additional network performance data to generate new or updated explanation rules.

In an embodiment, a security analysis system starts by processing a small set of training data, and uses the training date to generate an initial mapping between the anomalies and the features, and an initial set of explanation rules. As information about additional anomalies and network performance becomes available, the system analysis system may refine the mapping and the rules, and may add new elements to the mapping and to the rules.

In an embodiment, a security analysis system is scalable in terms of the ability to process data received from not just one, but from a plurality of network security systems. Furthermore, the security analysis system may be scalable in terms of the ability to process data received from not one, but from a plurality of IDS. Moreover, the security analysis system may be implemented in a network of computing devices, and may be configured to generate a plurality of mappings between anomalies and features. For example, a security analysis system may be implemented in network of computing devices that share a plurality of mappings between anomalies and features and that share access to the mappings and the explanation rules. The plurality of mappings may be customized for each individual IDS, especially if the IDS are provided by different suppliers. The rules may also be customized for each individual IDS, for types of anomalies, and the like.

In an embodiment, a security analysis system allows identifying features and values of the features that are useful in generating explanations of the anomalies detected by one or more IDS. The process of identifying features and explanations for the anomalies may be represented as a feature selection algorithm, in which data samples are divided in to two classes, including the samples that are anomalies and the samples that are not anomalies. The data samples serve as a training set for the feature selection algorithm. In the proposed approach. Once the training set is formed, the security analysis system generates a mapping between the anomalies and the features, and then the rules for explaining the anomalies. The process may be repeated as new information about anomalies and network performance becomes available. Thus, as new data is provided to the security analysis system, the explanation rules become more accurate and robust. Furthermore, as the new data becomes available, the security analysis system may be modified and expanded.

10. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
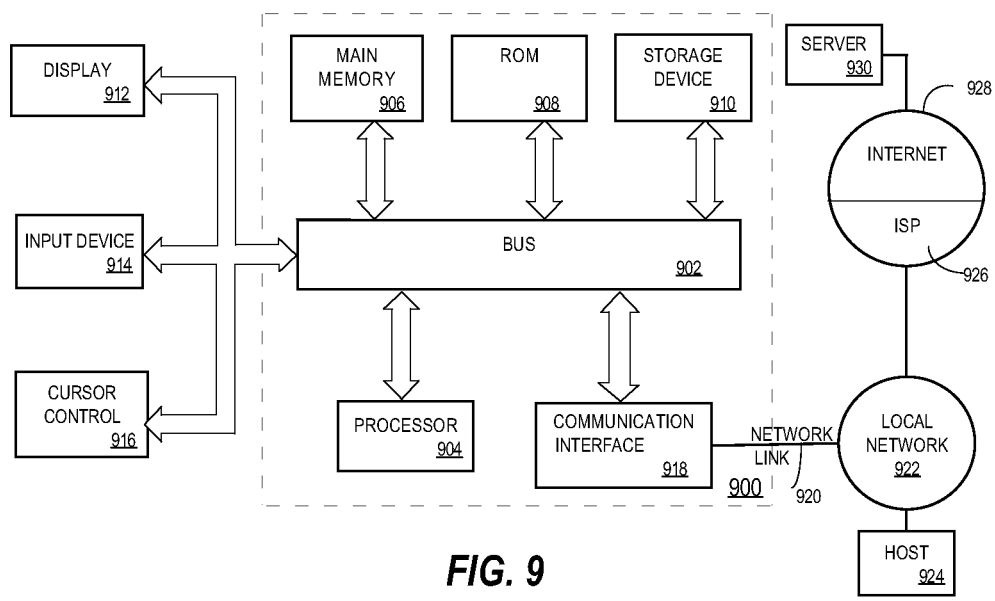
FIG. 9 illustrates a computer system with which various embodiments may be used.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing system comprising:
  one or more processors;
  one or more non-transitory computer-readable storage media storing sequences of instructions which, when executed by the one or more processors, cause the one or more processors to perform:
  receiving network performance data for a computer network;
  receiving, from an intrusion detection system (IDS), network anomaly data indicating a plurality of anomalies that have occurred in the computer network;
  based, at least in part, on the network performance data and the network anomaly data, generating feature data;
  wherein the feature data specifies: information about transmissions of large files, a status of a packet retransmission rate, a status of a large files transfer count, a status of an email volume size, counts of undelivered communications, access failure information, device failure information;
  for each anomaly of the plurality of anomalies, selecting, from the feature data, a minimal set of features comprising at least two of: information about transmissions of large files, a status of a packet retransmission rate, a status of a large files transfer count, a status of an email volume size, counts of undelivered communications, access failure information, device failure information, that distinguishes the anomaly, in the plurality of anomalies, from non-anomalies and from any other anomalies in the plurality of anomalies, and creating a mapping of the anomaly to the minimal set of features;
  based at least in part on the mapping, generating explanation rules for the plurality of anomalies;
  for a particular anomaly of the plurality of anomalies, identifying a particular rule of the explanation rules that is associated with the particular anomaly, and generating explanation data for the particular anomaly based upon the particular rule.

2. The system of claim 1, comprising instructions which when executed cause:
  identifying, in the particular rule, a particular minimal set of features associated with the anomaly;
  generating an explanation based on contents of the particular minimal set of features;
  providing the explanation to one or more users.

3. The system of claim 1, comprising instructions which when executed cause:
  receiving from the IDS an indication that a new anomaly has occurred in the computer network;
  determining whether the explanation rules contain a specific rule for the new anomaly;
  in response to determining that the explanation rules contain the specific rule for the new anomaly, generating a specific explanation of the new anomaly using the specific rule.

4. The system of claim 3, comprising instructions which when executed cause:
  in response to determining that the explanation rules do not contain the specific rule for the new anomaly:
    based, at least in part, on the network performance data and the indication of the new anomaly, updating the feature data;
    determining, using the updated feature data, a new minimal set of features that distinguishes the new anomaly from the non-anomalies;
    creating a new mapping of the new anomaly to the new minimal set of features;
    based at least in part on the new mapping, generating the specific rule for the new anomaly;
    generating, using the specific rule for the new anomaly, a new explanation for the new anomaly.

5. The system of claim 1, comprising instructions which when executed cause including, in the minimal set of features generated for the particular anomaly, one or more features that are specific to a state of the computer network at approximately the same time at which the particular anomaly occurred.

6. The system of claim 1, wherein the feature data further specifies at least two of: information about packet retransmissions, information about active communications connections, information about email transmissions, information about traffic from a particular domain, information about traffic to a particular domain a status of an active connections count.

7. The system of claim 1, comprising instructions which when executed cause normalizing, based at least in part on default values of the minimal set of features, feature data included in the minimal set of features.

8. The system of claim 1, wherein the IDS is configured to not provide explanations for the anomalies.

9. The system of claim 1, wherein the network performance data is received from one or more network security systems.

10. The system of claim 1, wherein the explanation rules are modified upon receiving new network performance data or indication of additional anomalies.

11. A data processing method comprising:
receiving network performance data for a computer network;
receiving, from an intrusion detection system (IDS), network anomaly data indicating a plurality of anomalies that have occurred in the computer network;
based, at least in part, on the network performance data and the network anomaly data, generating feature data;
wherein the feature data specifies: information about transmissions of large files, a status of a packet retransmission rate, a status of a large files transfer count, a status of an email volume size, counts of undelivered communications, access failure information, device failure information;
for each anomaly of the plurality of anomalies, selecting, from the feature data, a minimal set of features comprising at least two of: information about transmissions of large files, a status of a packet retransmission rate, a status of a large files transfer count, a status of an email volume size, counts of undelivered communications, access failure information, device failure information, that distinguishes the anomaly, in the plurality of anomalies, from non-anomalies and from any other anomalies in the plurality of anomalies, and creating a mapping of the anomaly to the minimal set of features;
based at least in part on the mapping, generating explanation rules for the plurality of anomalies;
for a particular anomaly of the plurality of anomalies, identifying a particular rule of the explanation rules that is associated with the particular anomaly, and generating explanation data for the particular anomaly based upon the particular rule; wherein the method is performed using one or more computing devices.

12. The method of claim 11, further comprising:
identifying, in the particular rule, a particular minimal set of features associated with the anomaly;
generating an explanation based on contents of the particular minimal set of features;
providing the explanation to one or more users.

13. The method of claim 11, further comprising:
receiving from the IDS an indication that a new anomaly has occurred in the computer network;
determining whether the explanation rules contain a specific rule for the new anomaly;
in response to determining that the explanation rules contain the specific rule for the new anomaly, generating a specific explanation of the new anomaly using the specific rule.

14. The method of claim 13, further comprising:
in response to determining that the explanation rules do not contain the specific rule for the new anomaly:
based, at least in part, on the network performance data and the indication of the new anomaly, updating the feature data;
determining, using the updated feature data, a new minimal set of features that distinguishes the new anomaly from non-anomalies in the plurality of anomalies;
creating a new mapping of the new anomaly to the new minimal set of features;
based at least in part on the new mapping, generating the specific rule for the new anomaly;
generating, using the specific rule for the new anomaly, a new explanation for the new anomaly.

15. The method of claim 11, further comprising including, in the minimal set of features generated for the particular anomaly, one or more features that are specific to a state of the computer network at approximately the same time at which the particular anomaly occurred.

16. The method of claim 11, wherein the feature data further specifies at least two of: information about packet retransmissions, information about active communications connections, information about email transmissions, information about traffic from a particular domain, information about traffic to a particular domain a status of an active connections count.

17. The method of claim 11, further comprising normalizing, based at least in part on default values of the minimal set of features, feature data included in the minimal set of features.

18. The method of claim 11, wherein the IDS is configured to not provide explanations for the anomalies.

19. The method of claim 11, wherein the network performance data is received from one or more network security systems.

20. The method of claim 11, wherein the explanation rules are modified upon receiving new network performance data or indication of additional anomalies.

* * * * *